Patented Dec. 9, 1952

2,621,162

UNITED STATES PATENT OFFICE 2,621,162

3-PROPARGYL-4-QUINAZOLONES AND ACID SALTS THEREOF AND METHODS OF MAKING THE SAME

Bernard Randall Baker, Nanuet, N. Y., assignor to American Cyanamid Company, New York, N. Y., a corporation of Maine No Drawing. Application January 10, 1951, Serial No. 205,423

13 Claims. (Cl. 260—251)

This invention relates to new propargyl quinazolones and methods of making the same.

The new class of propargyl quinazolones of this invention, when in the form of their free bases, may be represented by the following formula:

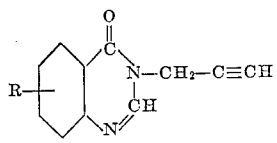

in which R is hydrogen or at least one substituent on the benzene ring of the quinazolone nucleus. The new quinazolone compounds may be isolated as the free base, or if desired, they may also be isolated in the form of their acid salts, i. e., as the hydrochloride.

The substituent or substituents represented by R in the above formula may vary within wide limits and may be on one or more of the five, six, seven or eight positions of the quinazolone nucleus. Substituents of the following types are of value: halogen, for instance, Cl, Br, and Fl; alkoxy and aryloxy, for instance, —OCH₃—OC₂H₅, —OCH₂C₆H₅, and —OC₆H₅; hydroxyl radicals; lower alkyl radicals, for instance, methyl, ethyl, propyl and butyl; aryl radicals, for instance, phenyl and substituted phenyl radicals; acyl radicals, for instance, —COR in which R is hydrogen or lower alkyl; acyloxy radicals, for instance, —OCOR in which R may represent H or lower alkyl; carboxyl radicals (—COOH) and the esters, amides and salts thereof.

The new compounds of this invention are amazingly useful in organic synthesis, for instance, as dye intermediates or in the preparation of pharmaceuticals. The high reactivity of the acetylene linkage in the aliphatic side chain permits the addition of substituents of almost any desired type. For example, the new compounds may be reacted with various aminoaldehydes in the presence of sulfuric acid to form valuable pharmaceuticals. It is intended, however, that this invention cover the new compounds per se and it is not to be construed as being limited to any particular field of utility.

While it is not intended that this invention be limited to propargyl quinazolones made by any specific process, a particularly convenient method of preparing the new compounds has been discovered and this new method also constitutes a part of this invention. The new method comprises reacting a propyne derivative with a quinazolone derivative in accordance with the following general equation:

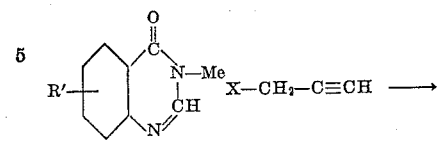

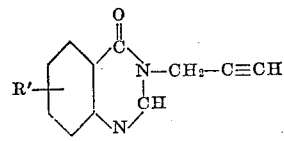

in which Me is metal or the equivalent, X is halogen or the equivalent, and R' is as defined above.

The propyne derivative above is preferably a propargyl halide: that is, X in the above equation represents halogen, for instance, chlorine, bromine, or iodine. Because of the ease of preparation and its advantageous reaction velocity, propargyl bromide is preferred. However, there are certain radicals which are recognized equivalents of the halogens for condensation reactions and propargyl derivatives of these may also be employed in the process of this invention. Examples of such equivalent radicals are the sulfonic ester radicals

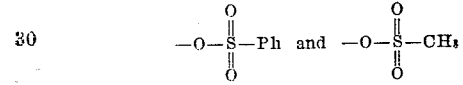

The quinazolone derivative in the above general equation is preferably a metalo-quinazolone formed either from a mono or polyvalent metal. Examples of suitable metals are the following: alkali metals, for instance, sodium, potassium, and lithium; alkaline earth metals, for instance, calcium and barium. Because of the ease of preparation and advantageous reaction velocity, the sodio-quinazolones are preferred. Again, there are certain recognized equivalents of the metals, and the quinazolone derivatives of these are also suitable for the process of this invention. For example, certain quaternary ammonium derivatives of quinazolones are quite satisfactory.

The quinazolone derivatives above described may be conveniently prepared from a quinazolone and a strong base of the metal or equivalent. Examples of suitable bases are: metal hydroxides, for instance, sodium hydroxide, and barium hydroxide; quaternary ammonium bases, for instance, trimethyl benzyl ammonium hydroxide and tetraethyl ammonium hydroxide; metal hydrides, for instance, sodium hydride; metal amides, for instance, sodamide; metal alcoholates, for instance, sodium methoxide; metal alkylides, for instance, ethyllithium; and other bases of this type.

In general, it will be found convenient to perform the reaction of the quinazolone derivative with the propyne derivative in an inert solvent or diluent. Any inert liquid may be used but for reasons of convenience, the lower alcohols, such as methanol, ethanol, propanol, 2-methoxyethanol, and the like are the most satisfactory. Examples of other inert liquids which may be used are the simple ethers, for instance, methyl or ethyl ether; cyclic ethers, for instance, dioxane; aralkyl alcohols, for instance, benzyl alcohol; and esters, for instance, ethylacetate. When a solvent is employed the quinazolone derivative may advantageously be formed in situ without the need of isolation.

Temperature in the above reaction is not critical and the reaction may satisfactorily be carried out at room temperature. It has, however, been found that higher temperatures favor the reaction, and the reaction may generally be advantageously performed at temperatures between 50 and 115° C. While convenience would ordinarily limit one to the reflux temperature of the solvent employed, the reaction may be, if desired, carried out at temperatures up to the decomposition temperature of the reactants or reaction product.

The reaction proceeds immediately at room temperature and in most instances is substantially complete in about forty-eight hours. The reaction in most instances is substantially complete in about one to two hours at 80° C. and in a proportional length of time at intermediate temperatures.

The invention is more fully illustrated by the following examples in which all parts are by weight unless otherwise specified:

*Example I*

To a hot solution of 2 parts by weight of 4-quinazolone in 13.7 parts by volume of a 1N methanol solution of sodium methoxide there is added 1.2 parts by volume of propargyl bromide. After refluxing for one hour, the solution is concentrated and diluted with several volumes of water. The white crystals, melting point about 114–116° C., are recrystallized from toluene to give white needles of 3-propargyl-4-quinazolone having a melting point of about 116–116.5° C. This compound is soluble in methanol, chloroform, hot benzene or hot toluene, but is insoluble cold in water, benzene, toluene and petroleum ether.

*Example II*

A solution of 11.8 parts by weight of 4-chloro-7-methoxyisatin (Helv. chim, acta, 2, 239) in 100 parts by volume of 5% sodium hydroxide is treated with 15 parts by volume of 30% hydrogen peroxide over a period of ten minutes. Approximately ten minutes after the addition of the peroxide, the solution is clarified with activated carbon (Norit) and neutralized with hydrochloric acid. The precipitate is separated and recrystallized from aqueous methanol to obtain a yield of about 6 parts by weight of 3-methoxy-6-chloroanthranilic acid having a melting point of about 145–146° C.

A mixture of 4.8 parts by weight of 3-methoxy-6-chloroanthranilic acid and 2 parts by volume of formamide is heated at about 130–135° C. for about forty-five minutes and at about 175° C. for about seventy-five minutes. Addition of about 3.5 parts by volume of 2-methoxyethanol and about 35 parts by volume of water gives 5-chloro-8-methoxy-4-quinazolone which when recrystallized from 2-methoxyethanol, forms white crystals having a melting point, with decomposition, of 311–313° C.

By condensing 2.9 parts by weight of 5-chloro-8-methoxy-4-quinazolone with 1.2 parts by volume of propargyl bromide according to the procedure of Example I there is obtained 3-propargyl-5-chloro-8-methoxy-4-quinazolone in approximately equal yield.

*Example III*

In place of the 4-quinazolone of Example I there is employed 2.2 parts by weight of 5-methyl-4-quinazolone (Ber., 52, 1084). 3-propargyl-5-methyl-4-quinazolone is obtained in approximately equal yield.

*Example IV*

Fusion of 12.6 parts by weight of 6-chloroanthranilic acid (Monats., 22, 488) with 11 parts by volume of formamide according to the procedure of Example II gives approximately 10 parts by weight of tan crystals of 5-chloro-4-quinazolone having a melting point of about 210° C. after recrystallization from aqueous 2-methoxyethanol.

By condensing 2.5 parts by weight of 5-chloro-4-quinazolone with 1.2 parts by volume of propargyl bromide according to the procedure of Example I, there is obtained 3-propargyl-5--chloro-4-quinazolone in approximately equal yield.

*Example V*

3-propargyl-6-methyl-4-quinazolone is prepared by the procedure of Example I, using 2.2 parts by weight of 6-methyl-4-quinazolone (Ber., 34, 3776) in place of the 4-quinazolone of that example.

*Example VI*

3-propargyl-6-chloro-4-quinazolone is prepared by the procedure of Example I, using 2.5 parts by weight of 6-chloro-4-quinazolone (J. Am. Chem. Soc., 68, 1304) in place of the 4-quinazolone of that example.

*Example VII*

To a hot solution of 19.6 parts by weight of 4-quinazolone in 135 parts by volume of methanol containing 7.8 parts by weight of sodium methoxide there is added 9.5 parts by volume of propargyl bromide. After refluxing for two hours, the solution is concentrated to about 75 parts by volume, diluted with 150 parts by volume of water, and cooled. The 3-propargyl-4-quinazolone separates as white crystals having a melting point of about 106–108° C.

*Example VIII*

To a solution of 2 parts by weight of 4-quinazolone in 20 parts by volume of methanol and 6 parts by volume of 38% aqueous trimethyl benzyl ammonium hydroxide there is added 1.2 parts by volume of propargyl bromide. The mixture is heated to 60° C. for 2 hours, concentrated, and then diluted with several volumes of iced water. The resulting 3-propargyl-4-quinazolone has a melting point of about 115–116° C. after recrystallization from toluene.

Example IX

To a solution of 2 parts by weight of 4-quinazolone and 2.2 parts by volume of barium hydroxide octahydrate in 20 parts by volume of methanol and 10 parts by volume of 2-methoxyethanol there is added 1.2 parts by volume of propargyl bromide. The mixture is refluxed for two hours after which it is concentrated, then diluted with several volumes of iced water. The 3-propargyl-4-quinazolone separates as white crystals.

I claim:

1. New compounds selected from the group consisting of the 3-propargyl-4-quinazolones and acid addition salts thereof.
2. 3-propargyl-5-methyl-4-quinazolone.
3. 3-propargyl-5-chloro-4-quinazolone.
4. 3-propargyl-6-methyl-4-quinazolone.
5. 3-propargyl-6-chloro-4-quinazolone.
6. 3-propargyl-4-quinazolone.
7. A process for preparing 3-propargyl-4-quinazolones which comprises contacting, under reactive conditions, a salt selected from the group consisting of alkali metal salts, alkaline earth metal salts and quaternary ammonium salts, of a 4-quinazolone with a propyne derivative of the formula:

$$X-CH_2-C{\equiv}CH$$

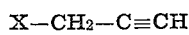

in which X represents a member selected from the group consisting of halogen and sulfonic ester substituents.

8. The process of claim 7 when said quinazolone salt is a salt of an alkali metal and said propyne derivative is a propargyl halide.
9. The process of claim 7 when the said quinazolone salt is sodio-4-quinazolone and said propyne derivative is propargyl bromide.
10. A process for preparing 3-propargyl-5-methyl-4-quinazolone which comprises adding propargyl bromide to a solution of sodio-5-methyl-4-quinazolone in a lower alkyl alcohol solvent.
11. A process for preparing 3-propargyl-5-chloro-4-quinazolone which comprises adding propargyl bromide to a solution of sodio-5-chloro-4-quinazolone in a lower alkyl alcohol solvent.
12. A process for preparing 3-propargyl-6-methyl-4-quinazolone which comprises adding propargyl bromide to a solution of sodio-6-methyl-4-quinazolone in a lower alkyl alcohol solvent.
13. The 3-propargyl-5-halo-4-quinazolones.

BERNARD RANDALL BAKER.

No references cited.